United States Patent [19]
Cippitani

[11] Patent Number: 5,488,970
[45] Date of Patent: Feb. 6, 1996

[54] L.P.G. (LIQUID PROPANE GAS) TANKS, IN PARTICULAR WITH REFERENCE TO THE POSITIONING OF THE VALVE GROUPS

[76] Inventor: Luciano Cippitani, Via Reynolds 2467, Cisterna di Latina, Italy

[21] Appl. No.: 211,989
[22] PCT Filed: Nov. 2, 1992
[86] PCT No.: PCT/IT92/00137
 § 371 Date: Apr. 25, 1994
 § 102(e) Date: Apr. 25, 1994
[87] PCT Pub. No.: WO93/09001
 PCT Pub. Date: May 13, 1993

[30] Foreign Application Priority Data
Nov. 6, 1991 [IT] Italy ................. 91A000837

[51] Int. Cl.⁶ ................................ F16K 37/00
[52] U.S. Cl. ......................... 137/351; 137/559
[58] Field of Search .................. 137/351, 559, 137/259, 267

[56] References Cited
U.S. PATENT DOCUMENTS
5,022,428  6/1991  Vilines .................. 137/351

FOREIGN PATENT DOCUMENTS
96036    2/1924  Australia ................. 137/559
370367   8/1982  Australia .
0283696  2/1988  European Pat. Off. .
1229317  9/1960  France .................... 137/559
2585446  7/1918  United Kingdom .
117343   7/1918  United Kingdom .
836366   6/1960  United Kingdom .
2095808  3/1981  United Kingdom .

Primary Examiner—A. Michael Chambers
Attorney, Agent, or Firm—Laurence R. Brown

[57] ABSTRACT

This invention concerns improvements to toroidal-shaped L.P.G. tanks (1) which, due to their particular shape, may be easily placed inside the spare wheel compartment (10). In the toroidal-shaped tank described herein, the hollow center of the tank is used for positioning the valve group connection rings (3), which may either project or be flush-mounted and also for allowing the passage of the pipes (4, 5) for connecting the tank with the engine fuel supply system and the filler. The valves are placed between a lid (6), at the top, and a bottom plate (7) tide to each other in such a manner as to constitute an airtight chamber.

4 Claims, 8 Drawing Sheets

L.P.G. (LIQUID PROPANE GAS) TANKS, IN PARTICULAR WITH REFERENCE TO THE POSITIONING OF THE VALVE GROUPS

DESCRIPTION

Improvements to L.P.G. (liquid propane gas) tanks, in particular with reference to the positioning of the valve groups.

1. Technical Field

This invention concerns improvements to toroidal-shaped L.P.G. tanks which, due to their particular shape, may be easily placed inside the spare wheel compartment. In the toroidal-shaped tank described herein the hollow centre of the tank is used for positioning the valve group connection rings, which may either project or be flush-mounted and also for allowing the passage of the pipes for connecting the tank with the engine fuel supply system and the filler.

The valves are placed between a lid, at the top, and a bottom plate tied to each other in such a manner as to constitute an airtight chamber

2. Background Art

In L.P.G. tanks and, in particular, in the toroidal-shaped tanks produced to date, the fuel-filling valve group is generally located on the outside of the tank itself, so that it is necessary to make a hole for connecting the valve group with the outside filler. Alternative solutions also patented by the same holder describe the possibility of positioning the multivalve connection ring in a recessed position, with regard to the tank walls.

Such a solution, however, determines bulky appendixes which may cause problems.

Other alternative solutions have been described, for example, in FR Patent No. 883,075 and GB 117.343 and in AT Patent 370.367.

FR Patent 883.075 shows a ring-shaped tank that can be placed in the hollow intended for the spare tire, in particular for the external spare tire of motor vehicles, and is provided with a valve for filling it that can be reached from the central inside part of the tank.

GB Patent 117.343 describes a toroidal tank with the filling valve placed in the middle, empty part of the tank itself. AT Patent 370.367 describes a tank for GPL in which two bases of a ring-shaped tank are united to each other by a tubular, modeled element.

DISCLOSURE OF INVENTION

This invention provides for a toroidal-shaped tank with the possibility of positioning the multivalve ring, for both the Italian and the foreign markets, inside the hollow centre of the tank, either projecting or flush-mounted in the tank itself, allowing the passage of the two pipes which connect the tank with the engine fuel supply system and the filler, said pipes passing through small holes specifically designed for the ventilation of the chamber, by means of a breather flange located on the bottom of the luggage compartment (and protected on the outside by a carter), in order to position it in the best possible manner possible for fuel filling from the outside.

In order to prevent any pollution of the air or of the luggage compartment and, therefore, any leaks into the passenger compartment, the chamber in the middle of the tank housing the valves is sealed by a lid at the top and a plate at the bottom, strongly fixed to each other by means of a tie rod. The top lid has a transparent window in the middle so that the valves may be inspected. Furthermore, the space between the tank and the tank-housing in the luggage compartment is also sealed, in order to prevent any leaks, thus creating a chamber which is airtight towards the inside of the vehicle and which may discharge any leaks towards the outside of the vehicle through the holes bored for the passage of the pipes.

The foregoing summary explanation may be better understood from the following detailed description, making reference to the attached drawings, in which:

FIG. 1b shows a bird's-eye view of the tank shown in the FIG. 1a.

Figure 1:
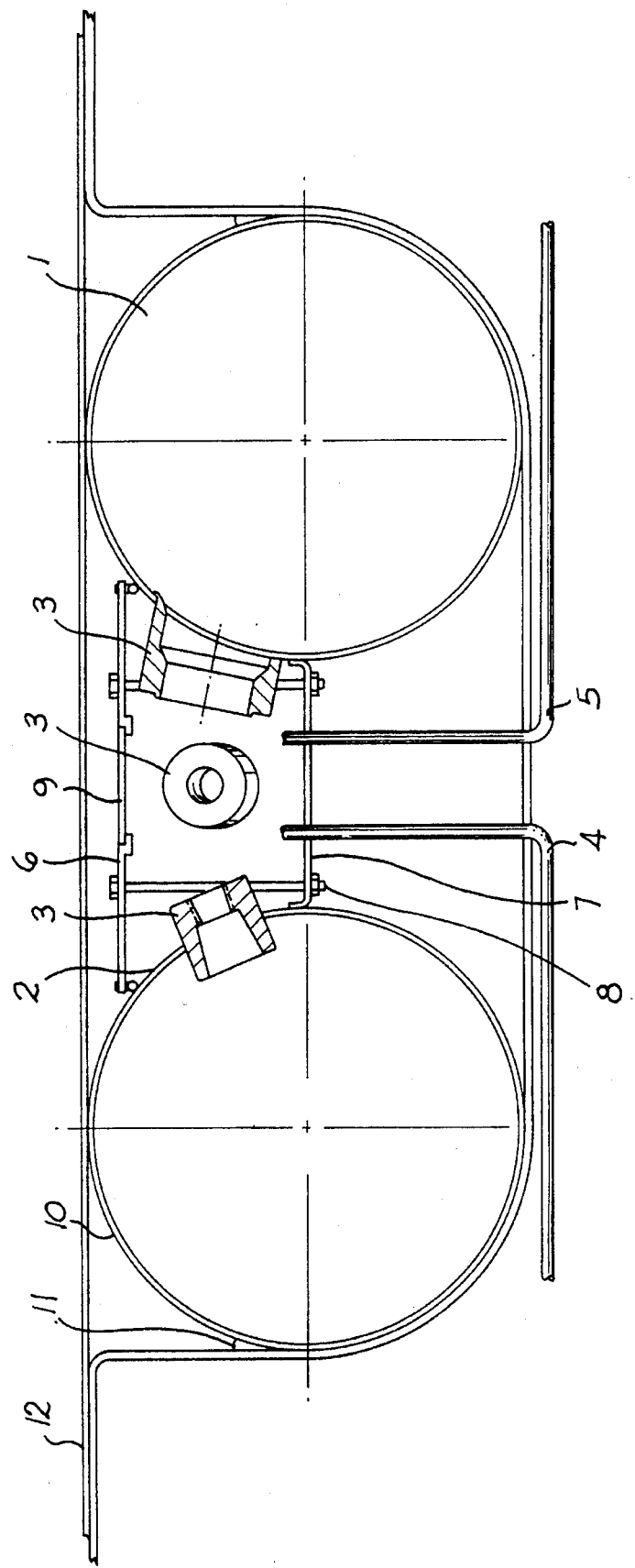
FIG. 1 shows a cross-section of the preferred positioning of the valve connection rings on a toroidal-shaped tank placed in a luggage compartment.

With reference to the above mentioned figures, and in particular to FIG. 1, the L.P.G. tank described herein consists of a toroidal-shaped tank (1) on the sides (2) of which; facing towards the hollow space in the centre, are positioned two or more rings (3) for connecting the valve groups. Two pipes (4) and (5) pass through the middle hollow part of the tank (1): one leads from the tank filling valve to the filler, which may also be placed on the outside of the vehicle, while the other leads from the fuel supply valve to the engine fuel supply system.

The valves, positioned on one or more of the rings (3), are closed between a lid (6) at the top, which is sealed by special screws or other sealing means and a plate (7) at the bottom, so as to prevent even the smallest leaks from entering the vehicle passenger compartment.

The airtight lid (6) is screwed to the tank together with the bottom plate (7) by means of bolts (8) or other similar and, preferably, fast-closing means, which also fix the one to the other, thus ensuring that they adhere tightly to the outside surface of the tank (1). The lid (6) is also provided with a transparent window (9), made of glass or other similar material, allowing the inspection of the valves without having to open the airtight chamber.

Figure 1A:
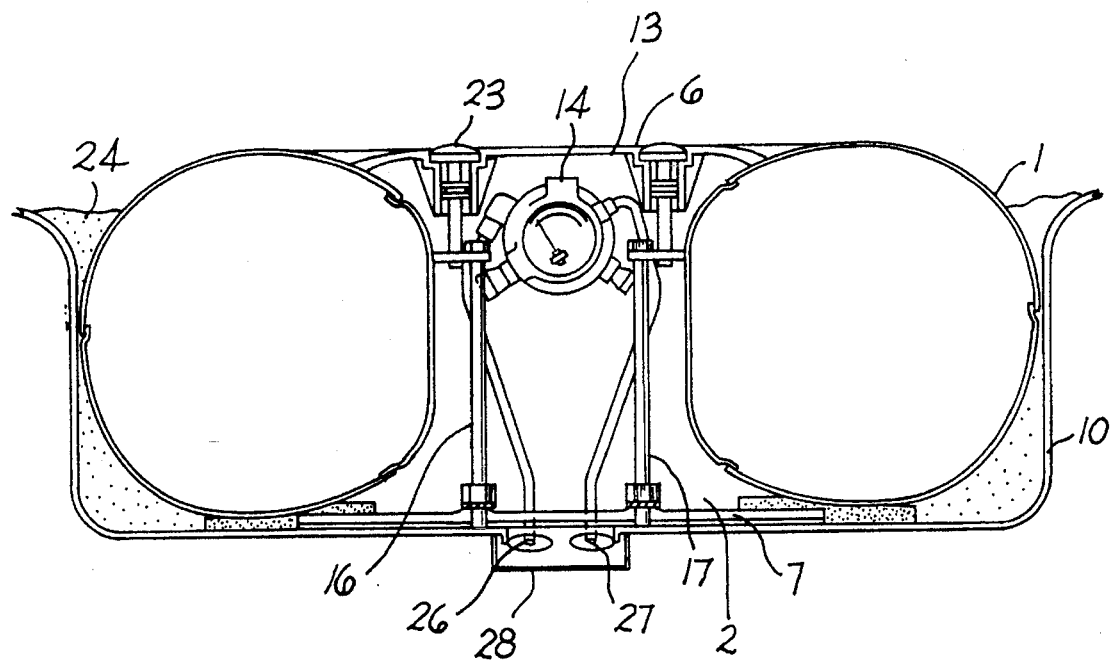
FIG. 1a shows a cross-section of the toroidal tank described herein housed in the spare wheel compartment.

FIG. 1a shows a cross-section of the tank (1) according to the usual manner of installation inside the spare wheel compartment (10).

In the hollow space in the centre of the tank (13), on one of the sides (2) of the tank (1) facing towards the inside, there is a multivalve group (14) which, in the Italian version, carries out the gas filling, distribution and regulation functions and which is also provided with a gauge for checking the gas level in the tank.

Two pipes (4) and (5) are used for filling the tank and feeding the engine fuel supply system, respectively.

Figure 1C:
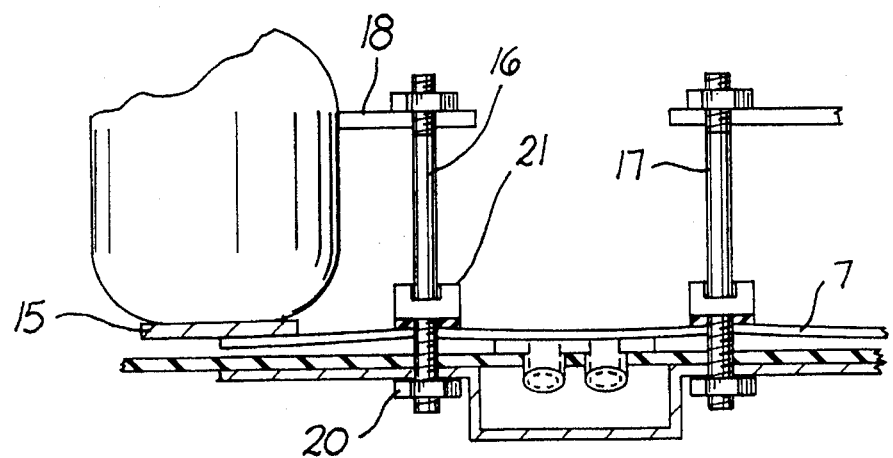
FIG. 1c shows some details of the fastening of the tank and the bottom plate gasket.
Figure 1B:
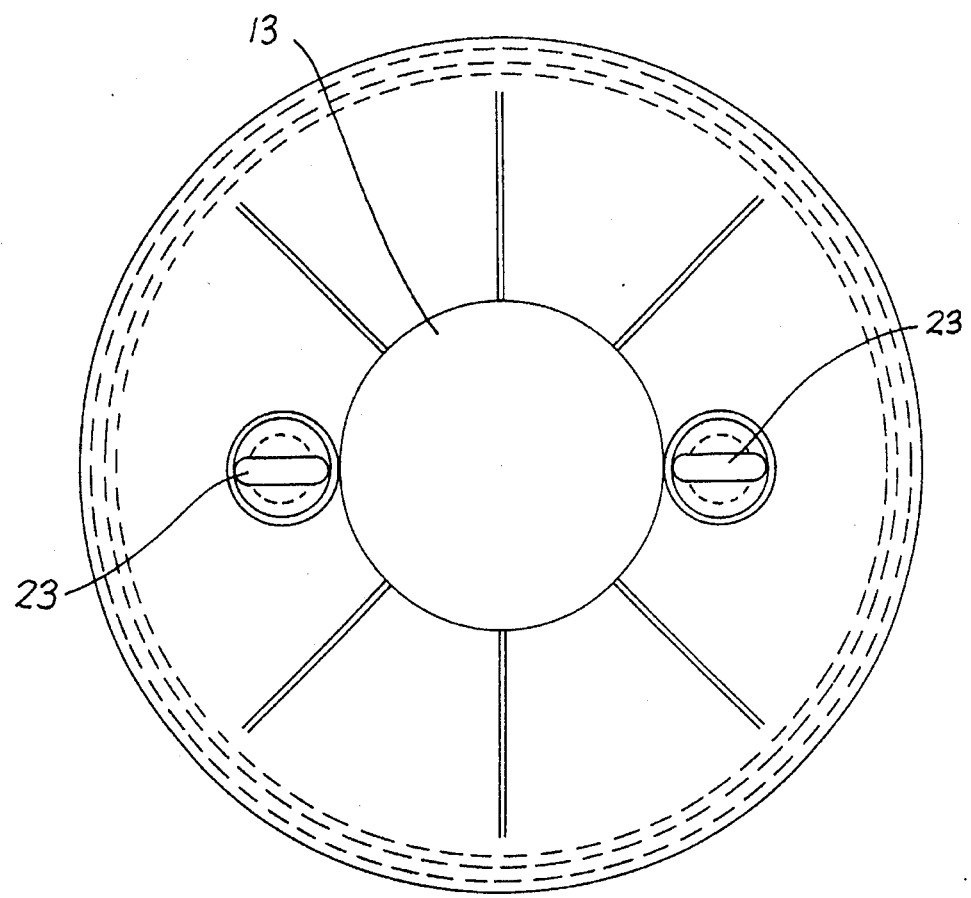
Figure 1D:
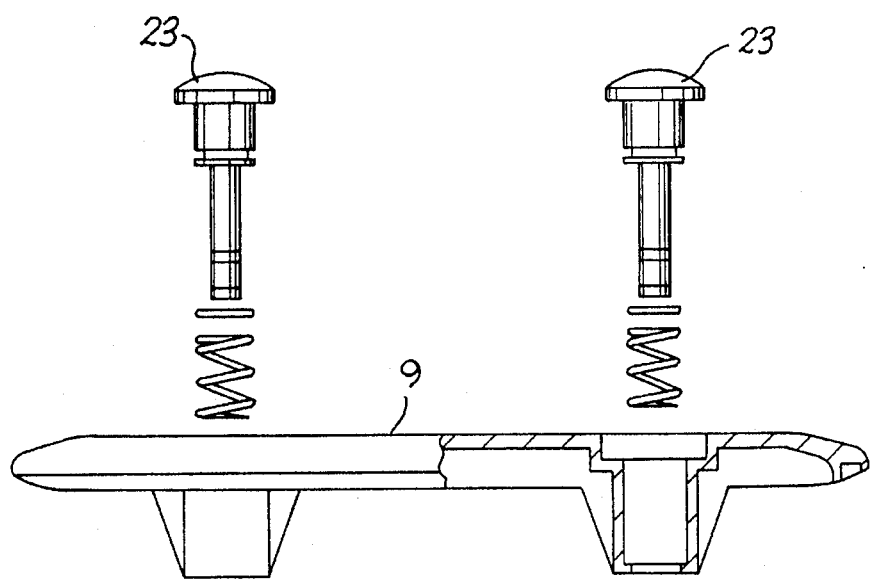
FIG. 1d shows a side view of the top lid of the valve chamber.
Figure 2:
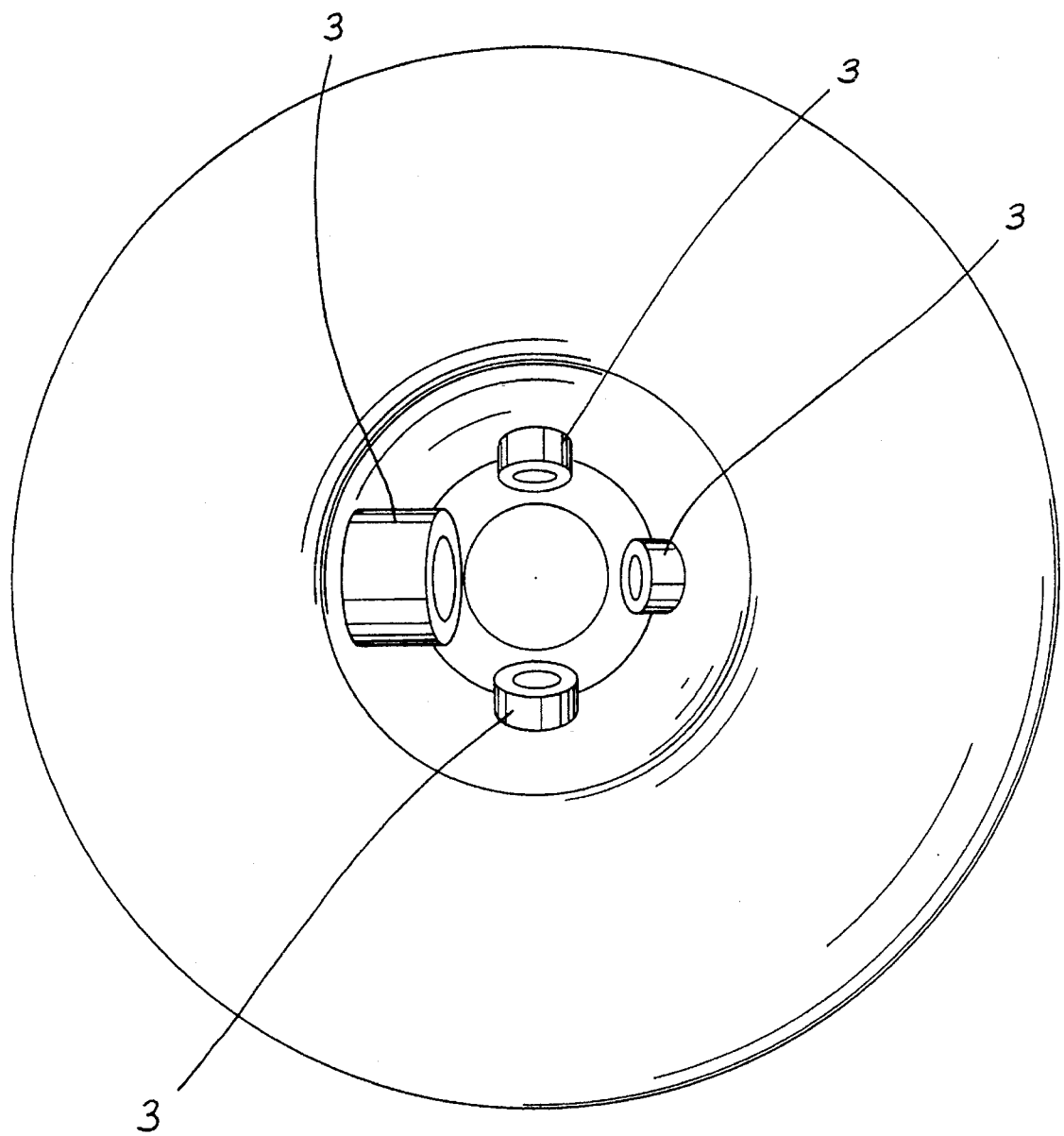
FIG. 2 shows a bird's-eye view of the toroidal-shaped tank.
Figure 3:
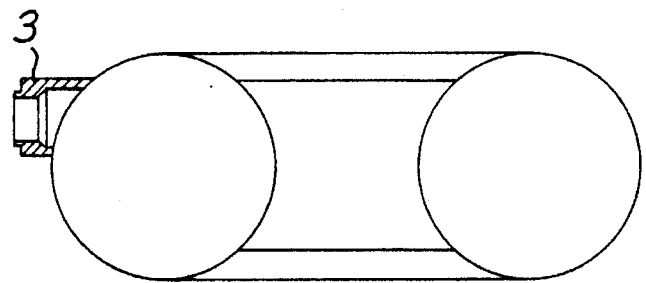
FIGS. 3 to 13 show various possibilities of positioning the valve connection rings.
Figure 4:
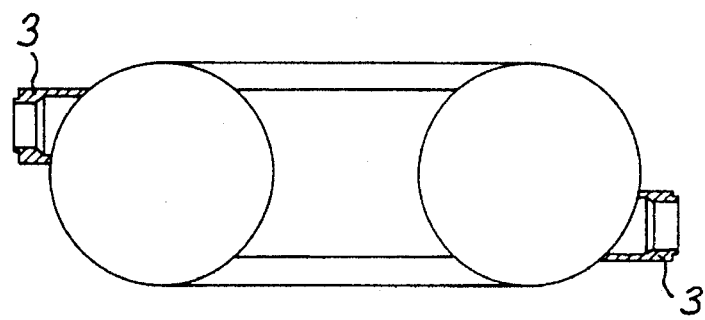
Figure 5:
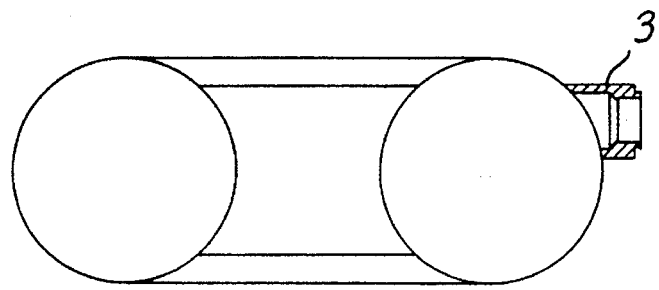
Figure 6:
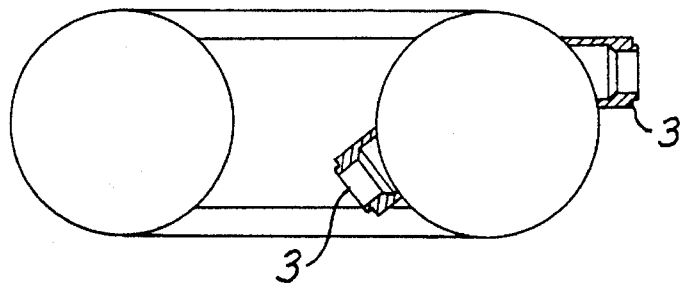
Figure 7:
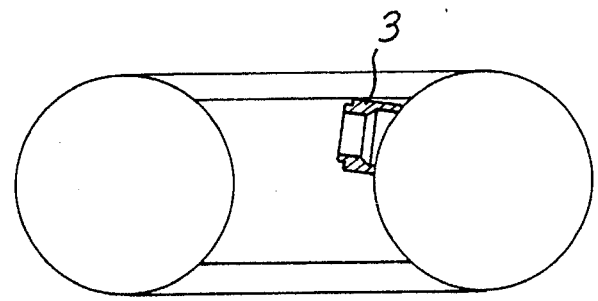
Figure 8:
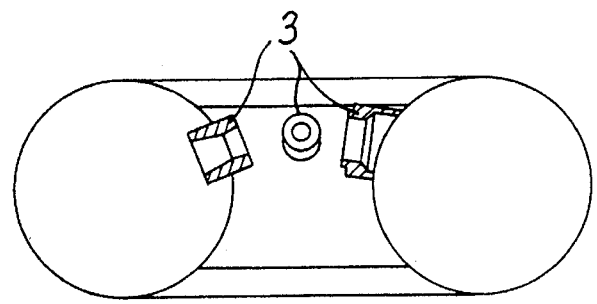
Figure 9:
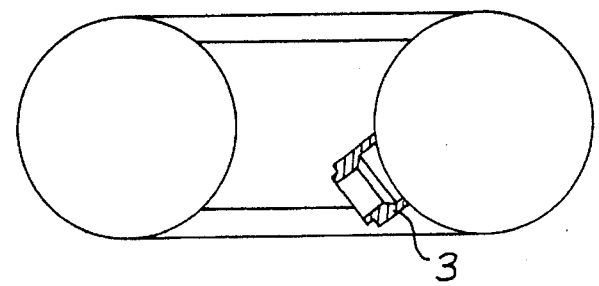
Figure 10:
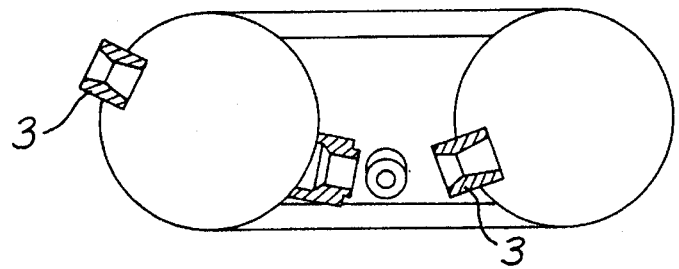
Figure 11:
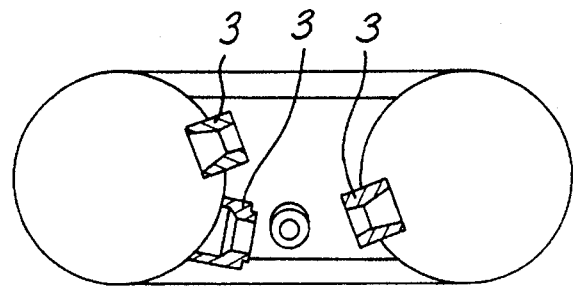
Figure 14:
FIGS. 14, 15 and 16 show a cross-section off the valves placed in a flush-mounted position.
Figure 12:
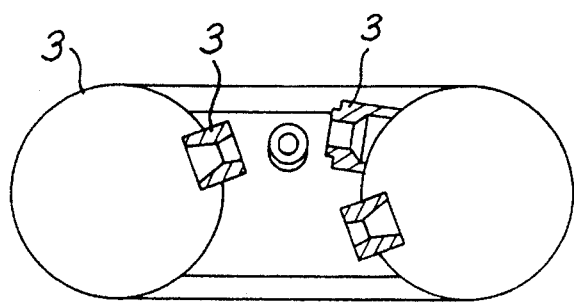
Figure 15:
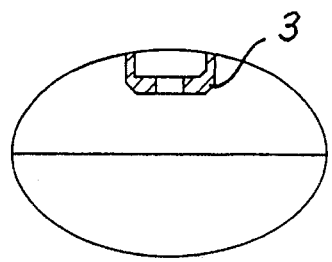
Figure 13:
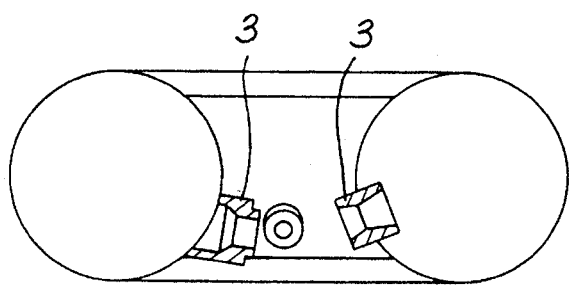
Figure 16:
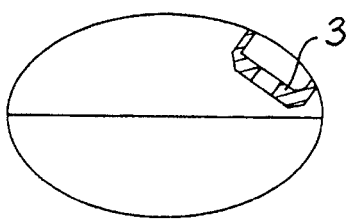

The toroidal-shaped tank may be perfectly fitted inside the spare wheel compartment (10); the hollow space in the centre of the tank (13) is closed at the bottom by a plate (7) and between said plate (7) and the tank (1) there is an expanded polyethylene gasket (15), which is tightly fixed to the tank by means of two anchored tie rods, which may be better observed in FIG. 1c; said tie rods are fixed to the tank by means of special brackets (18) and nuts (19) and to the bottom plate by means of a nut (20) screwed on the tie rod passing through a hole, bored through the bottom plate and sealed by means of a specific gasket (21). The upper brackets, besides serving the aim of clamping the bottom plate, also further fasten the multivalve group and carry the holes (22) in which the setscrews (23) of the top lid are screwed, best seen in FIG. 1d.

The entire space between the side and bottom walls of the toroidal-shaped tank (1) and the vehicle spare wheel compartment is filled with a special sealing material (24), in order to absolutely prevent any gas-leaks penetrating inside the vehicle passenger compartment. For the ventilation of the multivalve group chamber there are two breathers (26) and (27), one of which faces the direction of movement of the vehicle and the other faces the opposite direction, so as to create a balanced circulation within the chamber. The breathers are protected by a metal cover (28).

The whole device is covered by the rubber mat of the luggage compartment, which can be used without any particular problems.

As previously stated, FIG. 1 shows the preferred solution with regard to the valve and valve group positioning, but it is obvious that many other positions are possible, ideas being given in figs. from 3 to 16, both inside and outside the hollow space in the centre of the tank, some of the solutions being similar to those provided for in previous patents by the same holder.

Figure 17:
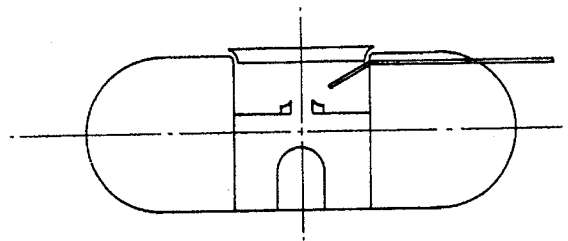
FIGS. 17, 18 and 19 show the positioning of the central multivalve group, in respect of the hollow space in the centre of the tank.
Figure 18:
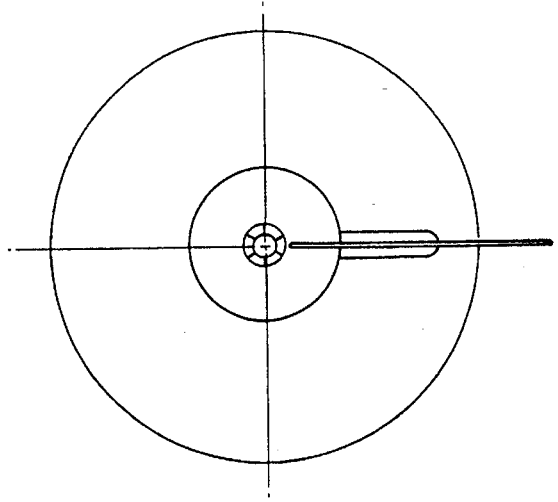
Figure 19:
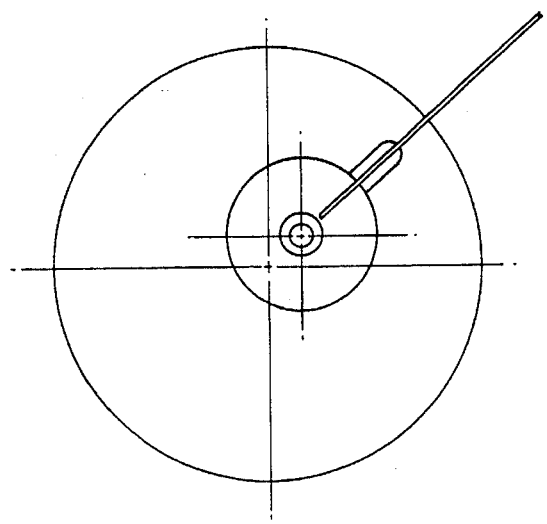

FIGS. 17, 18 and 19 show how the valve group may be placed not only on the sides of the hollow space in the centre of the toroidal-shaped tank, but also on the plate at the bottom of said space or even on a level parallel to said plate and at a predetermined height from the bottom. FIG. 19 also shows that the hollow space need not necessarily be right in the middle of the tank, but may also be slightly removed, if such a solution should prove more useful or easier to install.

I claim:

1. An improved propane fuel tank provided with at least one valve connection assembly penetrating though a tank wall for filling the fuel tank and distributing gas to an automotive vehicle, comprising in combination:

an automotive vehicle having a spare wheel compartment, a toroidal-shaped fuel tank shaped with a central hollow space, mounting means for fitting said tank to fit inside the spare wheel compartment, means for attaching said valve connection assembly to an inner wall of the tank facing the hollow space to reside within the hollow space thereby leaving the outer toroidal tank wall free from penetration, a first pipe coupled to the valve connection assembly for filling the tank externally from the vehicle, and a second pipe coupled to the valve connection assembly for supply of engine fuel to the vehicle.

2. A toroidal-shaped tank, according to claim 1 further comprising a sealing material positioned between the fuel tank and the spare wheel compartment for preventing gas leak penetration into the vehicle.

3. A toroidal-shaped tank as defined in claim 1 wherein said means for attaching the connection assembly further comprises a closure lid on an airtight chamber.

4. A toroidal-shaped tank as defined in claim 1 further comprising two breathers in said airtight chamber, one of which faces the direction of movement of the vehicle and the other of which faces the opposite direction for creating a balanced circulation of air within the chamber.

* * * * *